United States Patent
Steadman Booker et al.

(10) Patent No.: US 11,448,781 B2
(45) Date of Patent: Sep. 20, 2022

(54) PHOTON COUNTING DETECTOR

(71) Applicant: KONINKLIJKE PHILIPS N.V., Eindhoven (NL)

(72) Inventors: Roger Steadman Booker, Aachen (DE); Ewald Roessl, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/263,916

(22) PCT Filed: Aug. 1, 2019

(86) PCT No.: PCT/EP2019/070753
§ 371 (c)(1),
(2) Date: Jan. 28, 2021

(87) PCT Pub. No.: WO2020/025743
PCT Pub. Date: Feb. 6, 2020

(65) Prior Publication Data
US 2021/0302599 A1 Sep. 30, 2021

(30) Foreign Application Priority Data
Aug. 1, 2018 (EP) .................................... 18186822

(51) Int. Cl.
*G01T 1/24* (2006.01)
*G01T 1/29* (2006.01)
(52) U.S. Cl.
CPC ............ *G01T 1/242* (2013.01); *G01T 1/2928* (2013.01)
(58) Field of Classification Search
CPC .............................. G01T 1/242; G01T 1/2928
See application file for complete search history.

(56) References Cited

U.S. PATENT DOCUMENTS

| 9,625,589 B2 | 4/2017 | Roessl | |
| 2006/0056581 A1* | 3/2006 | Hoffman | A61B 6/032 378/19 |

(Continued)

FOREIGN PATENT DOCUMENTS

| DE | 102012215818 A1 | 3/2014 |
| JP | H02259590 A | 10/1990 |

(Continued)

OTHER PUBLICATIONS

PCT International Search Report, International application No. PCT/EP2019/070753, dated Oct. 16, 2019.

*Primary Examiner* — Hugh Maupin
(74) *Attorney, Agent, or Firm* — Larry Liberchuk

(57) ABSTRACT

The present invention relates to a photon counting detector comprising a first direct conversion layer (10) comprising a low-absorption direct conversion material (11) for converting impinging high-energy electromagnetic radiation (100) into a first count signal and first electrical contacts (12), a second direct conversion layer (20) comprising a high-absorption direct conversion material (21) for converting impinging high-energy electromagnetic radiation (100) into a second count signal and second electrical contacts (22), said high-absorption direct conversion material having a higher absorption than said low-absorption direct conversion material, and a carrier layer (30, 30a, 30b) comprising first and second terminals (31, 32) in contact with the first and second electrical contacts and processing circuitry (35) configured to correct, based on the first count signal, the second count signal for errors, wherein said first direct conversion layer and the second direct conversion layer are arranged such that the high-energy electromagnetic radiation transmits the first direct conversion layer before it hits the second direct conversion layer.

15 Claims, 4 Drawing Sheets

(56) References Cited

U.S. PATENT DOCUMENTS

| | | |
|---|---|---|
| 2008/0230709 A1 | 9/2008 | Tkaczyk |
| 2011/0303849 A1 | 12/2011 | Tredwell |
| 2012/0305757 A1* | 12/2012 | Kappler .................. G01T 1/40 250/252.1 |
| 2013/0256538 A1 | 10/2013 | Vogtmeier |
| 2016/0206255 A1 | 7/2016 | Gagnon |
| 2018/0356538 A1* | 12/2018 | Deych .................. G01T 1/2006 |

FOREIGN PATENT DOCUMENTS

| | | |
|---|---|---|
| WO | WO2014037247 A1 | 3/2014 |
| WO | WO2017116392 A1 | 7/2017 |

* cited by examiner

PHOTON COUNTING DETECTOR

FIELD OF THE INVENTION

The present invention relates to a photon counting detector and a correction device and method for a photon counting detector. The present invention relates further to a photon counting detection arrangement.

BACKGROUND OF THE INVENTION

The advent of energy-resolving photon counting spectral CT heavily relies on the maturity and stability of the direct conversion material. While further improvements on the material stability are forthcoming only slowly, methods to compensate the deviation from the expected number of counts need to be put in place. A number of methods are known, however with significant trade-offs in complexity and/or effectiveness of the corrective measures.

US 2008/230709 A1 discloses a diagnostic imaging system including a high frequency electromagnetic energy source that emits a beam of high frequency electromagnetic energy toward an object to be imaged. An energy discriminating (ED) detector receives high frequency electromagnetic energy emitted by the high frequency electromagnetic energy source. The ED detector includes a first direct conversion layer and a second direct conversion layer. The first direct conversion layer comprises a first direct conversion material and the second direct conversion layer comprises a second direct conversion material that is different from the first direct conversion material. A data acquisition system (DAS) is operably connected to the ED detector and a computer operably connected to the DAS.

JP-H02 259590 A discloses a radiation detecting device having a second detector formed of CdTe and first detector formed of a semiconductor GaAs with a larger carrier migration extent than CdTe. Then, about 50% of the radiation is first absorbed by the first detector and a large part of the remaining 50% of the radiation is absorbed by the second detector when the thickness of the detectors is, for example, 0.4 mm and the energy of the radiation R to be detected is 50 keV. Therefore, the number of radiation photons which are actually incident decreases to half on the second detector and the generation of a pile-up is decreased as compared with a case wherein only the second detector is used, so that the first detector may be thick enough to absorb a part of the radiation R to be detected.

US 2016/206255 A1 discloses a photon-counting detector apparatus configured to receive X-rays transmitted from an X-ray source. The photon-counting detector apparatus includes a first photon-counting detector having a first detecting material configured to detect photons using a first set of energy bins. The photon-counting detector apparatus also includes a second photon-counting detector arranged above the first photon-counting detector relative to an incidence direction of the X-rays transmitted from the X-ray source. The second photon-counting detector has a second detecting material configured to detect photons using a second set of energy bins. The first set of energy bins differs from the second set of energy bins.

There is still a need for a solution to compensate the deviation from the expected number of counts in a photon counting detector.

SUMMARY OF THE INVENTION

It is an object of the present invention to provide a photon counting detector, a correction device, a photon counting detection arrangement and corresponding methods for compensating the deviation from the expected number of counts.

In a first aspect of the present invention a photon counting detector is presented comprising a first direct conversion layer comprising a low-absorption direct conversion material for converting impinging high-energy electromagnetic radiation into a first count signal and first electrical contacts, a second direct conversion layer comprising a high-absorption direct conversion material for converting impinging high-energy electromagnetic radiation into a second count signal and second electrical contacts, said high-absorption direct conversion material having a higher absorption than said low-absorption direct conversion material, and a carrier layer comprising first and second terminals in contact with the first and second electrical contacts and processing circuitry configured to correct, based on the first count signal, the second count signal for errors, wherein said first direct conversion layer and the second direct conversion layer are arranged such that the high-energy electromagnetic radiation transmits the first direct conversion layer before it hits the second direct conversion layer, wherein said processing circuitry is further configured to use the first count signal as estimate of the impinging electromagnetic radiation for correcting a drift of the second count signal and to determine that there is a drift in the second count signal if there is a change in the second count signal but no change in the first count signal or if a correlation between the first count signal and the second count signal deviates from a reference correlation.

In a further aspect of the present invention a correction device for a photon counting detector is presented comprising a first signal input configured to obtain a first count signal representing high-energy electromagnetic radiation impinging on a low-absorption direct conversion material of a first direct conversion layer, a second signal input configured to obtain a second count signal representing high-energy electromagnetic radiation impinging on a high-absorption direct conversion material of a second direct conversion layer, said high-absorption direct conversion material having a higher absorption than said low-absorption direct conversion material, wherein said first direct conversion layer and the second direct conversion layer are arranged such that the high-energy electromagnetic radiation transmits the first direct conversion layer before it hits the second direct conversion layer, and processing circuitry configured to correct, based on the first count signal, the second count signal for errors, wherein said processing circuitry is further configured to use the first count signal as estimate of the impinging electromagnetic radiation for correcting a drift of the second count signal and to determine that there is a drift in the second count signal if there is a change in the second count signal but no change in the first count signal or if a correlation between the first count signal and the second count signal deviates from a reference correlation.

In a further aspect a photon counting detection arrangement is presented comprising:

a first direct conversion layer comprising a low-absorption direct conversion material for converting impinging high-energy electromagnetic radiation into a first count signal and first electrical contacts, a second direct conversion layer comprising a high-absorption direct conversion material for converting impinging high-energy electromagnetic radiation into a second count signal and second electrical contacts, said high-absorption direct conversion material having a higher absorption than said low-absorption direct conversion material, wherein said first direct conversion layer and the second direct conversion layer are arranged such that the high-energy electromagnetic radiation transmits the first direct conversion layer before it hits the second direct conversion layer, a carrier layer comprising first and second terminals in contact with the first and second electrical contacts, a correction device as disclosed herein, and connection means connecting the first and second terminals to the correction device.

In yet further aspects of the present invention, there are provided a corresponding method, a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed correction device and method, computer program and medium have similar and/or identical preferred embodiments as the claimed system, in particular as defined in the dependent claims and as disclosed herein.

The present invention is based on the idea to segment the detection volume into two distinct, preferably energy resolving layers. The first (with respect to the incident radiation higher/top) layer is intended to be a low absorption layer material, however with high stability performance. The second (with respect to the incident radiation lower) layer comprises a high absorption material. The top layer, which only sees a fraction of the total flux, serves as reference to correct the stability issues of the lower layer, but may in addition provide energy-resolving information.

The first layer with low absorption may e.g. be made of GaAs or Si. GaAs is a very stable material, which is however inadequate for CT as a stand-alone detector due to its low absorption. The second layer with high absorption may e.g. be made of Cd(Zn)Te (CZT) or CdTe, which is known to still offer insufficient stability for the stringent requirements of clinical CT, but provides sufficient absorption. In an embodiment a single ASIC substrate may be used to serve as carrier for both layers and for carrying processing circuitry for correcting, based on the first count signal of the first layer, the second count signal of the second count signal for errors caused mainly by the insufficient stability of the second layer. Accordingly, in an embodiment the processing circuitry is configured to correct the second count signal for errors caused by lower stability of the high-absorption direct conversion material compared to the low-absorption direction conversion material. With the disclosed photon counting detector, the deviation of the second count signal from the expected number of counts can be compensated.

High-energy electromagnetic radiation shall generally be understood as electromagnetic radiation having energies above e.g. 1 keV, preferably having reasonable clinically relevant energies, e.g. in the range above 20 keV (preferably up to e.g. 160 keV). This electromagnetic radiation is preferably x-ray radiation, but may generally also be gamma radiation.

In an embodiment said low-absorption direct conversion material is configured for converting high-energy electromagnetic radiation into one or more first energy-resolving count signals and said high-absorption direct conversion material is configured for converting high-energy electromagnetic radiation into one or more second energy-resolving count signals. This provides energy-resolved information. Further, this gives the option to use only part of the energy-resolved counts signals, e.g. below a lowest energy threshold, to determine the error in the second count signal and the required factor of correction of the second count signal. In another embodiment two or more (or even all) energy thresholds are used.

The processing circuitry is further configured to use the first count signal as estimate of the impinging electromagnetic radiation for correcting a drift of the second count signal. For instance, according to one option it is determined that there is a drift in the second count signal if there is a change in the second count signal but no change in the first count signal. Hereby, it may be determined that there is a drift in the second count signal if there is a change in a signal part of the second count signal below the lowest energy threshold but no change in corresponding signal part of the first count signal below the lowest energy threshold. According to another option the processing circuitry is configured to determine that there is a drift in the second count signal if a correlation between the first count signal and the second count signal deviates from a reference correlation. These options provide for inexpensive and rather simple ways of enabling the desired correction of errors and thus improve the accuracy of the measurements and of a final count signal, which is represented by or determined from the corrected second count signal.

Another embodiment of the photon counting detector comprises a single carrier layer arranged between the first direct conversion layer and the second direct conversion layer, wherein the first terminals are arranged on a first surface side of the carrier layer and the second terminals are arranged on a second surface side of the carrier layer opposite the first surface side. In this embodiment the carrier layer is sandwiched between the first and second direct conversion layers, which share the carrier layer.

According to another embodiment two carrier layers are provided including a first carrier layer arranged between the first direct conversion layer and the second direct conversion layer, wherein the first terminals are arranged on a surface side of the first carrier layer facing the first direct conversion layer and being in contact with the first electrical contacts, and a second carrier layer arranged on a side of the second direct conversion layer facing away from the first direct conversion layer, wherein the second terminals are arranged on a surface side of the second carrier layer facing the second direct conversion layer and being in contact with the second electrical contacts. In this embodiment, each direct conversion layer has its own carrier layer. The processing circuitry may be provided on both carrier layers or on one of the two carrier layers, which are connected in some way so that both count signals are available to the processing circuitry for determining the correction of the second count signal.

Generally, the low-absorption direct conversion material may comprise one of silicon, indium phosphide, mercuric iodide and gallium arsenide and the high-absorption direct conversion material comprises one of cadmium telluride and cadmium zinc telluride.

The thickness of the first direct conversion layer may be lower than the thickness of the second direct conversion layer. There are, however, other embodiments as well. For instance, if Si is used as low-absorption direct conversion material, the thickness of the first direct conversion layer may exceed the thickness of the second direct conversion layer. General, in the first direct conversion layer it is not required to have much absorption, but noise may exist if the first direct conversion layer does not at least absorb a sufficient number of photons.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
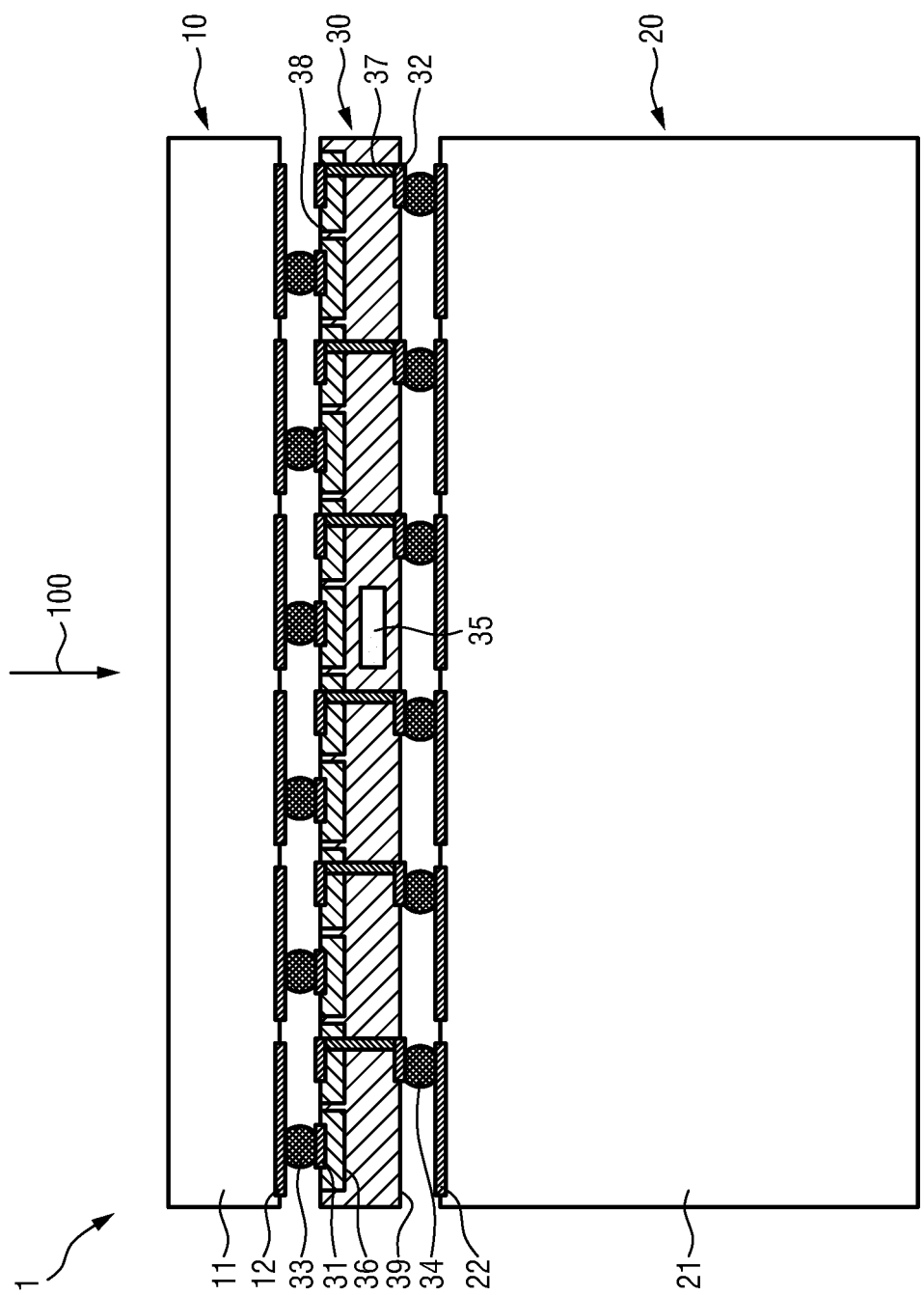
FIG. 1 shows a schematic diagram of a first embodiment of a photon counting detector according to the present invention.

FIG. 1 shows a schematic diagram of a first embodiment of a photon counting detector 1. It comprises a first direct conversion layer 10, a second direct conversion layer 20 and a carrier layer 30.

The first direct conversion layer 10 comprises a low-absorption direct conversion material 11 for converting impinging high-energy electromagnetic radiation 100 (in particular x-ray radiation) into a first count signal and first electrical contacts 12. The low-absorption material may e.g. be GaAs. Good detection-grade GaAs sensors are available in e.g. 200 μm thickness (up to 500 μm). A 200 μm thick GaAs only absorbs about 24% of the impinging photons for a 120 kVp spectrum.

The second direct conversion layer 20 comprises a high-absorption direct conversion material 21 for converting impinging high-energy electromagnetic radiation 100 into a second count signal and second electrical contacts 22. The high-absorption direct conversion material 21 has a higher absorption than said low-absorption direct conversion material 11 and may e.g. be Cd(Zn)Te, e.g. of 2 mm thickness, which absorbs in excess of 98% of the photons.

The first direct conversion layer 10 and the second direct conversion layer 20 are arranged such that the high-energy electromagnetic radiation 100 transmits (i.e., penetrates) the first direct conversion layer 10 before it hits the second direct conversion layer 20.

The carrier layer 30 comprises first terminals 31 and second terminals 32. The first terminal 31 are arranged on a first surface side 38 of the carrier layer 30 and are in contact with the first electrical contacts 12, e.g. via solder bumps 33. The second terminal 32 are arranged on a second surface side 39 of the carrier layer 30 opposite the first surface side and are in contact with the second electrical contacts 22, e.g. via solder bumps 34.

The carrier layer 30 further comprises processing circuitry 35, e.g. photon counting electronics, for correcting, based on the first count signal, the second count signal for errors. The carrier layer 30 may e.g. be configured as ASIC layer and may consist of a Si substrate that can be thinned down to minimize the absorption (e.g. to <100 μm).

In the photon counting detector 1 shown in FIG. 1 a single ASIC layer 30 is used as carrier to acquire the impinging photons of the two distinct detection layers 10, 20 placed on top and bottom of the ASIC layer 30. The ASIC layer 30 comprises as many pixels 36 as the total number of detection pixels (i.e. first and second electrical contacts 12, 22) available for both layers 10, 20. In the cross-section shown in FIG. 1, the odd numbered pixels (left to right) connect with the top layer 10 via the first terminals 31 and the even number of pixels the second terminals 32 and connect the bottom layer 20.

The use of a single ASIC layer 30 as carrier implies that the bottom layer 20 is connected to its corresponding ASIC pixel by means of a TSV (Through Silicon Via) 37.

A number of configurations are possible, however not restricted to. For example, both layers 10, 20 may be equipped with 1×1 mm$^2$ pixel, and an arrangement of 16×16 pixels. The ASIC layer 30 then serves a total of 512 sensor anodes. In this example, the ASIC pixel area needs to be <0.5 mm$^2$.

Alternatively, the bottom layer 20 (or the top layer 10) may be equipped with a higher density of pixel contacts. In one example, the top layer 10 may be equipped with 16×16 pixel. For each GaAs pixel 36, the bottom layer 20 underneath may be equipped with 4 pixels, i.e. 32×32 pixel in total. As the top layer 10 primarily serves as a reference for correction of the stability of the bottom layer 20, it is not strictly necessary that both layers 10, 20 have the same number of pixels. Preferably, pixels on the top layer and pixels (or plurality of pixels) on the bottom layer substantially correspond to the same detection volume. In this particular example, the ASIC layer 30 serves a total of 1280 pixels.

The correction/compensation of the instabilities in the lower layer 20 can be performed off-chip (or offline), i.e., by an external processing unit, on the basis of the collected data. According to the present invention, the processing circuitry 35 is provided on or within the carrier layer 30.

The top layer 10 provides a good estimate of the impinging flux, which can be used as a measure of correction of drifts of the bottom layer 20. In a first approximation, a drift of counts of the bottom layer 20 may be interpreted as a net drift of the energy drift of the thresholds (due to material instability) if said drift is not observed on the top layer 10.

In an embodiment the low-absorption direct conversion material 11 is configured for converting the high-energy electromagnetic radiation 100 into a first energy-resolving count signal and the high-absorption direct conversion material 21 is configured for converting the high-energy electromagnetic radiation 100 (in particular the part of the radiation 100 that pass through the top layer 10 and the carrier layer 30) into a second energy-resolving count signal. In this case, the lowest energy threshold (e.g. counts above 25 keV, can be used as a good approximation to estimate the impinging flux per pixel and to detect if a change of counts in the lower layer is caused by drifts or by x-ray flux. For instance, a discriminator at a given energy threshold may trigger for every photon above the threshold.

An embodiment of a correction scheme for instabilities in the bottom layer 20 may be configured as follows. For stable top and bottom layer sensors the measurement count rates for the lowest energy thresholds NT and NB should correlate very well. These correlations are assessed during a calibration measurement at lower flux before detector is actually used, e.g. in a CT scan. In case the bottom layer 20 shows instabilities during the scan, correlations measured over a few projections, which would manifest as significant deviations from the correlation measured during the low flux calibration measurement, corrections may be implemented on the bottom layer counts on the basis of achieving the correlations measured during the calibration measurement.

In other words, the first count signal may be used as estimate of the impinging electromagnetic radiation for correcting a drift of the second count signal. If there is a drift in the second count signal may be determined by checking if there is a change in the second count signal but no change in the first count signal, in particular if there is a change in a signal part of the second count signal below the lowest energy threshold but no change in corresponding signal part of the first count signal below the lowest energy threshold. Alternatively, a drift in the second count signal may be determined by checking if a correlation between the first count signal and the second count signal deviates from a reference correlation, e.g. as measured during a calibration measurement in advance.

It should be noticed that it is expected that the lowest thresholds are highly correlated. This could be used also as a measure of the quality of the correction.

In the embodiment shown in FIG. 1, it is assumed that the photons from both layers 10, 20 are acquired by the same front-end electronics (processing circuitry), including the same number of energy bins and count-rate performance. In another embodiment, the ASIC pixels are particularly adapted for the layer that they are assigned to.

For example, pixels 36a assigned to the top layer 10, given the lower absorption (e.g. <200 μm thick GaAs), may not need to be capable of very high rates, and the processing unit 35 may be optimized for improved noise performance.

In yet a further embodiment, pixels assigned to the top layer 10 (i.e., the odd numbered pixels in FIG. 1) may not require as many energy thresholds as the pixels assigned to the bottom layer 20 (near negligible absorption for high energy events). Even further, in another embodiment the pixels assigned to the top layer 10 may be equipped with only a single energy threshold above the noise level.

The packaging requirements are similar to the 4-side buttable technologies developed for the photon counting detector and conventional planar dual-layer detectors.

Figure 3:
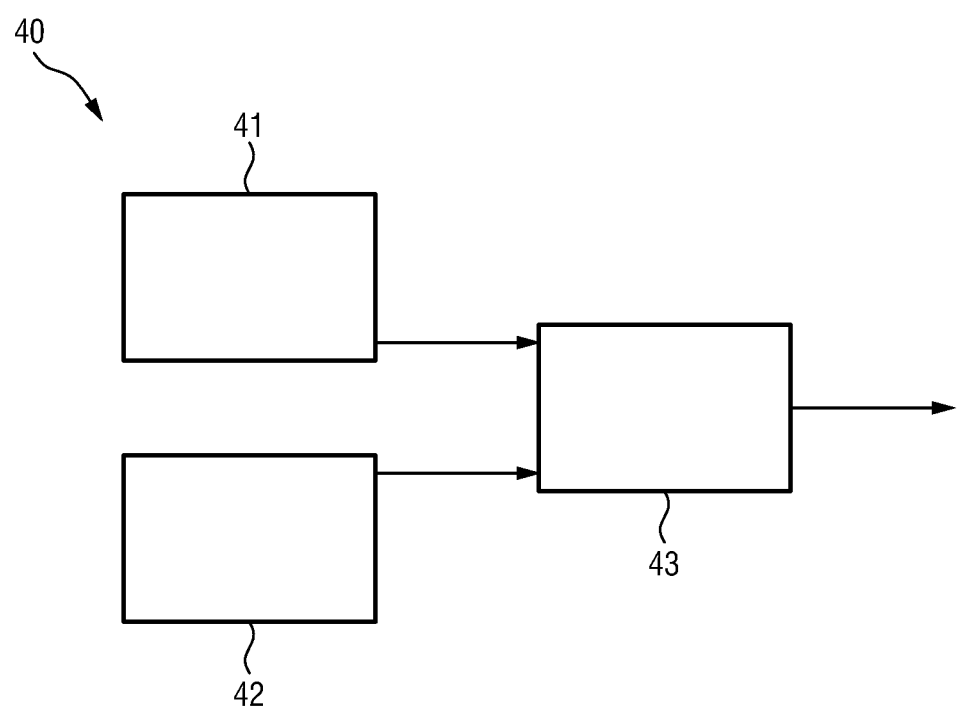
FIG. 3 shows a schematic diagram of a correction device according to the present invention.

In another embodiment a flex cable may be provided to lead the signals from the carrier layer (e.g. directly from the pixels) to an external correction device (see FIG. 3). In this case, no processing unit may even be provided in the carrier layer, but the complete signal processing including the above described correction may be provided in the external correction device, either on the fly or when desired.

In general, the low-absorption direct conversion material may be a material having an absorption of high-energy electromagnetic radiation in the range of 2% to 45%, in particular in the range of 10% to 25%, and the high-absorption direct conversion material may be a material having an absorption of high-energy electromagnetic radiation in the range of 55% to 98%, in particular in the range of 75% to 90%. The second direct conversion layer 20 may thus absorb asymptotically 100% of all photons.

The numbers given above indicate the distribution of the absorption across both layers. The minimum thickness of the second direct conversion layer 20 may be such that it effectively stops the photons with highest possible energy, i.e., a 2 mm CZT layer as second direct conversion layer 20 may still be needed even if there is a 200 μm GaAs layer provided as first direct conversion layer 10 on top because the probability of the first direct conversion layer 10 to absorb e.g. 120 keV photons is minimal. In total the stack of the layers 10 and 20 may stop close to 100% of photons in the range of energies of the respective application (for CT from up to 140 keV).

Theoretically, there is no upper limit of the absorption of the low-absorption direct conversion material. In practice, however, this is determined by the availability of the material in thick layers. If a sufficiently thick GaAs layer were available, it could be used and avoid the CZT layer altogether. Reasonably available GaAs layers have a thickness in the range of up to e.g. 200 μm or even 500 μm is also possible.

In an embodiment the high-absorption direct conversion material covers the range of absorption that the low-absorption direct conversion material of the first direct conversion layer 10 does not absorb. For instance, the first direct conversion layer 10 may be dimensioned according to what is feasible, which thereby establishes the minimum thickness of the second direct conversion layer 20, too.

Figure 2:
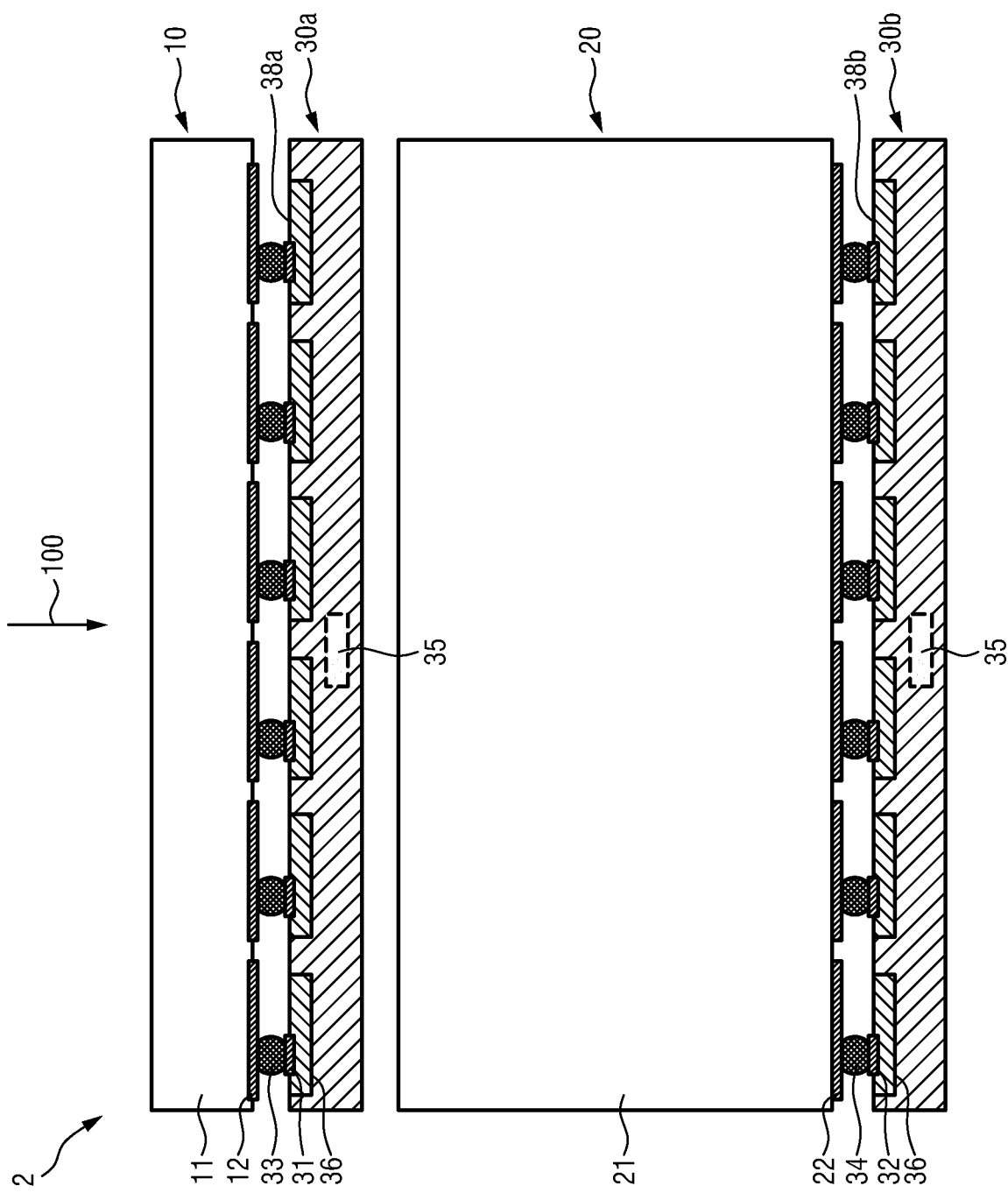
FIG. 2 shows a schematic diagram of a second embodiment of a photon counting detector according to the present invention.

In a further embodiment, the implementation shown in FIG. 1, can also be accomplished by means of two carrier layers 30a, 30b as shown in FIG. 2 depicting another embodiment of a photon counting detector 2.

The photon counting detector 2 comprises a first carrier layer 30a arranged between the first direct conversion layer 10 and the second direct conversion layer 20 and a second carrier layer 30b arranged on a side of the second direct conversion layer 20 facing away from the first direct conversion layer 10. The first terminals 31 are arranged on a surface side 38a of the first carrier layer 30a facing the first direct conversion layer 10 and being in contact with the first electrical contacts 12. The second terminals 32 are arranged on a surface side 39b of the second carrier layer 30b facing the second direct conversion layer 20 and being in contact with the second electrical contacts 22.

The processing unit 35 is either arranged in the first carrier layer 30a or in the second carrier layer 30b, or in both layers 30a and 30b independently, or partly in both carrier layers 30a, 30b. Interconnection means (e.g. one or more flex cables and/or integrated conductive lines) connecting two processing units and/or connecting the pixels 36 with the processing unit(s) 35 may be provided (not shown in FIG. 2). In an embodiment a flex cable is taking the signals out from one carrier layer on one side and leading it to the other carrier layer on the same side or on the other side. A flex cable could thus be used to establish communication between both carrier layers if required.

In another embodiment flex cables may be provided to lead the signals from both carrier layers to an external correction device (see FIG. 3). In this case, no processing unit may even be provided in any carrier layer, but the complete signal processing including the above described correction may be provided in the external correction device, either on the fly or when desired.

FIG. 3 shows a schematic diagram of a correction device 40 according to the present invention. The correction device 40 substantially corresponds to the processing unit 35 and can be used as external means in combination with a photon counting detector as illustrated above, which does not have an internal processing unit 35. The correction device 40 may e.g. be implemented as a (programmed) processor or (programmed) computer or dedicated hardware.

The correction device 40 comprises a first signal input 41 configured to obtain a first count signal representing high-energy electromagnetic radiation 100 impinging on the low-absorption direct conversion material 11 of the first direct conversion layer 10. The correction device 40 comprises a second signal input 42 configured to obtain a second count signal representing high-energy electromagnetic radiation 100 impinging on the high-absorption direct conversion material 21 of the second direct conversion layer 20.

The first and second signal inputs 41, 42 may be implemented as a common signal input, e.g. in the form of a data or signal interface receiving the first and second count signals from the photo counting detector, in particular the pixels of the photon counting detector.

The correction device further comprises processing circuitry 43 configured to correct, based on the first count signal, the second count signal for errors in one of the ways described above. The corrected second count signal alone or combined with the first count signal, which also provides information, may finally be used as the measurement signal of the photo counting detector, which is then further processed as desired by the application, e.g. which is used for generating an image of the scanned object.

Another embodiment of the correction, which may be applied by the correction device 40 or the processing unit 35, uses an iterative process to iteratively correct the measured data in the following way. In this embodiment a set of calibrations may be acquired in known conditions, particularly at low flux to minimize the artefacts of the bottom layer 20. This set of calibrations c is obtained with a number of materials m (leading to a plurality of baseline material decompositions). The measured data is used to perform an initial material decomposition A. Due to the materials used, it is known that the measurement G of the top layer 10 is correct and that the measurement C of the bottom layer 20 may be corrupted. G is probably a noisy measurement but with low bias (i.e., is quite accurate). The result of the material composition A is used to find the calibration data that correspond to the best fit (optionally the closest neighbor). The calibration data is use to scale the measurement C of the bottom layer 20. Based thereon a new material decomposition A' is calculated. This is likely an iterative process.

In more formal terms, this can be written as follows:
Top layer 10: measurement data G; calibration data $G^c$,m
Bottom layer 10: measurement data C; calibration data $C^c$,m
Material decomposition: A
Look-up: $G^{c,m}(A)$, $C^{c,m}(A)$
Correction of measurement data:

$$C' = \frac{C^{c,m}(A)}{G^{c,m}(A)} \cdot G$$

New material decomposition: A'

Figure 4:
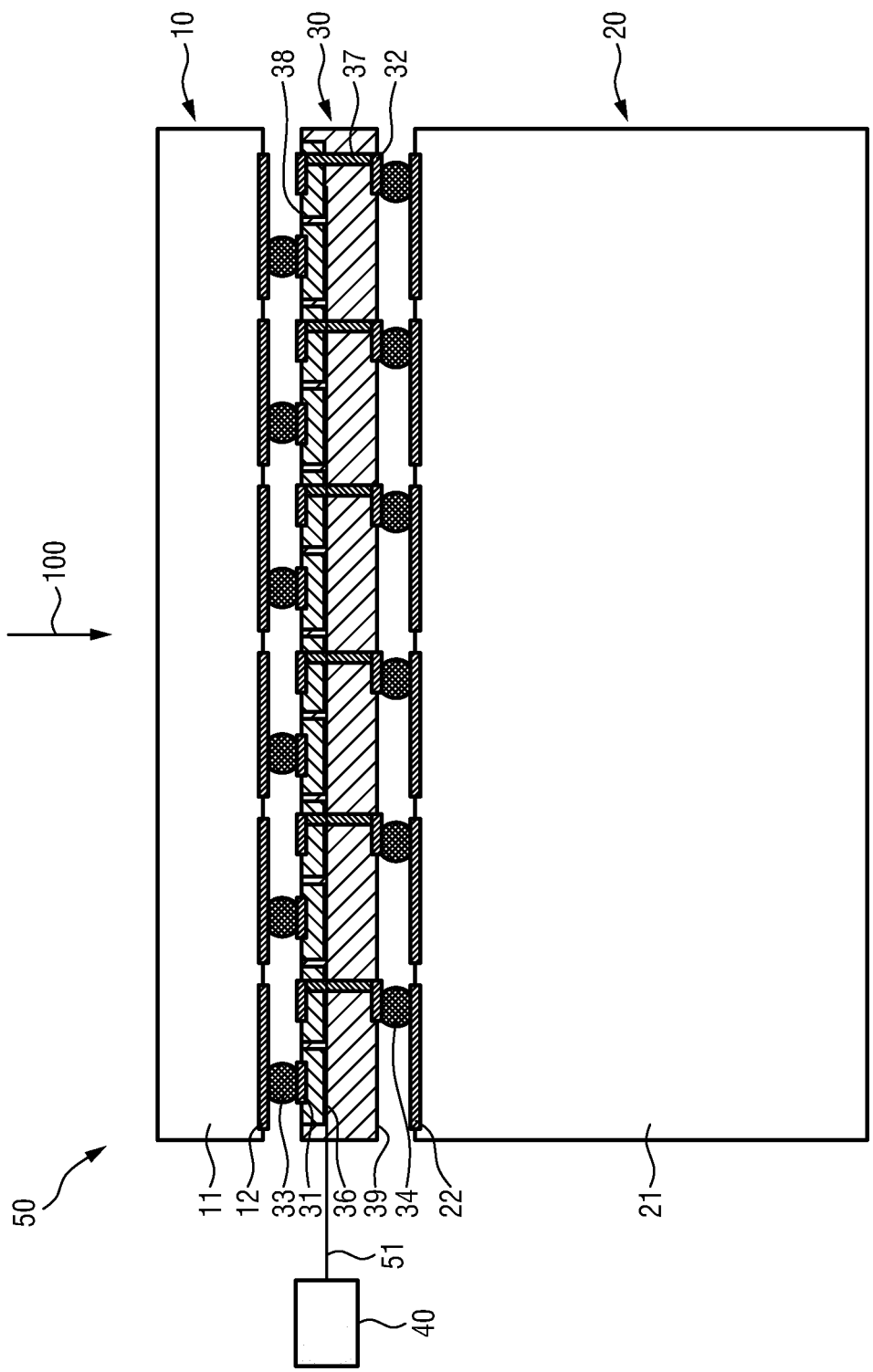
FIG. 4 shows a schematic diagram of a photon counting detection arrangement according to the present invention.

FIG. 4 shows a schematic diagram of a photon counting detection arrangement 50. It comprises a photo counting detector as disclosed herein (in this embodiment as depicted in FIG. 1; alternatively (not shown) as depicted in FIG. 2), but without having any processing circuitry as part of the carrier layer(s) 30. Further, a correction device 40 as disclosed herein, e.g. as shown in FIG. 3) is provided, Connection means 51, such as a flex cable, connects the first and second terminals 31, 32 of the carrier layer 30 (directly or, as shown in FIG. 4) via the pixels 36 to the correction device 40. In this way, the proposed correction is done externally in the correction device 40.

The present invention can preferably be applied for CT, such as spectral CT, but can generally be applied in all applications in which high-energy electromagnetic radiation shall be detected, particularly for imaging purposes, such as in medical imaging.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A photon counting detector, comprising:
   a first direct conversion layer comprising: a low-absorption direct conversion material configured to convert impinging high-energy electromagnetic radiation into a first count signal; and first electrical contacts;
   a second direct conversion layer comprising: a high-absorption direct conversion material configured to convert the impinging high-energy electromagnetic radiation into a second count signal; and second electrical contacts, the high-absorption direct conversion material having a higher absorption than the low-absorption direct conversion material,
      wherein the first direct conversion layer and the second direct conversion layer are arranged such that the high-energy electromagnetic radiation transmits the first direct conversion layer before the second direct conversion layer;
   a carrier layer comprising first and second terminals in contact with the first and second electrical contacts, and
   processing circuitry configured to a drift of the second count signal from the high-absorption direct conversion material, by determining that there is a drift in the second count signal from the high-absorption direct conversion material:
      when there is a change in the second count signal from the high-absorption direct conversion material but no change in the first count signal from the low-absorption direct conversion material; or
      when a correlation between the first count signal from the low-absorption direct conversion material and the second count signal from the high-absorption direct conversion material deviates from a reference correlation.

2. The photon counting detector as claimed in claim 1, wherein the low-absorption direct conversion material is configured to convert the high-energy electromagnetic radiation into one or more first energy-resolving count signals, and the high-absorption direct conversion material is configured to convert the high-energy electromagnetic radiation into one or more second energy-resolving count signals.

3. The photon counting detector as claimed in claim 1, wherein the processing circuitry is configured to correct the second count signal for errors caused by a lower stability of the high-absorption direct conversion material compared to the low-absorption direction conversion material.

4. The photon counting detector as claimed in claim 1, wherein the processing circuitry is configured to determine a drift in the second count signal when there is a change in a signal part of the second count signal below a lowest energy threshold but no change in corresponding signal part of the first count signal below the lowest energy threshold.

5. The photon counting detector as claimed in claim 1, comprising a single carrier layer arranged between the first direct conversion layer and the second direct conversion layer, wherein the first terminals are arranged on a first surface side of the carrier layer and the second terminals are arranged on a second surface side of the carrier layer opposite the first surface side.

6. The photon counting detector as claimed in claim 1 comprising:
a first carrier layer arranged between the first direct conversion layer and the second direct conversion layer, wherein the first terminals are arranged on a surface side of the first carrier layer facing the first direct conversion layer and being in contact with the first electrical contacts, and
a second carrier layer arranged on a side of the second direct conversion layer facing away from the first direct conversion layer, wherein the second terminals are arranged on a surface side of the second carrier layer facing the second direct conversion layer and being in contact with the second electrical contacts.

7. The photon counting detector as claimed in claim 1, wherein the low-absorption direct conversion material comprises one of silicon, indium phosphide, mercuric iodide, and gallium arsenide.

8. The photon counting detector as claimed in claim 1, wherein the high-absorption direct conversion material comprises one of cadmium telluride and cadmium zinc telluride.

9. The photon counting detector as claimed in claim 1, wherein the processing circuitry is included in the carrier layer.

10. The photon counting detector as claimed in claim 1, further comprising a correction device connected to the carrier layer,
wherein the processing circuitry is included in the correction device.

11. The photon counting detector as claimed in claim 1, wherein the processing circuitry is further configured to use the first count signal from the low-absorption direct conversion material as an estimate of the impinging electromagnetic radiation for correcting the drift.

12. The photon counting detector as claimed in claim 1, wherein the low-absorption direct conversion material has an absorption of high-energy electromagnetic radiation in a range of 10% to 25%, and the high-absorption direct conversion material has an absorption of high-energy electromagnetic radiation in a range of 75% to 90%.

13. The photon counting detector as claimed in claim 1, wherein the first direct conversion layer comprising the low-absorption direct conversion material is greater in thickness than the second direct conversion layer comprising the high-absorption direct conversion material.

14. A correction device for a photon counting detector, comprising:
a first signal input configured to obtain a first count signal representing high-energy electromagnetic radiation impinging on a low-absorption direct conversion material of a first direct conversion layer;
a second signal input configured to obtain a second count signal representing high-energy electromagnetic radiation impinging on a high-absorption direct conversion material of a second direct conversion layer, the high-absorption direct conversion material having a higher absorption than the low-absorption direct conversion material, wherein the first direct conversion layer and the second direct conversion layer are arranged such that the high-energy electromagnetic radiation transmits the first direct conversion layer before the second direct conversion layer; and
processing circuitry configured to correct a drift of the second count signal from the high-absorption direct conversion material, by determining that there is a drift in the second count signal from the high-absorption direct conversion material:
when there is a change in the second count signal from the high-absorption direct conversion material but no change in the first count signal from the low-absorption direct conversion material; or
when a correlation between the first count signal from the low-absorption direct conversion material and the second count signal from the high-absorption direct conversion material deviates from a reference correlation.

15. A correction method for a photon counting detector, comprising:
obtaining a first count signal representing high-energy electromagnetic radiation impinging on a low-absorption direct conversion material of a first direct conversion layer;
obtaining a second count signal representing high-energy electromagnetic radiation impinging on a high-absorption direct conversion material of a second direct conversion layer, the high-absorption direct conversion material having a higher absorption than the low-absorption direct conversion material, wherein the first direct conversion layer and the second direct conversion layer are arranged such that the high-energy electromagnetic radiation transmits the first direct conversion layer before it hits the second direct conversion layer; and
correcting a drift of the second count signal from the high-absorption direct conversion material, by that there is a drift in the second count signal from the high-absorption direct conversion material:
when there is a change in the second count signal from the high-absorption direct conversion material but no change in the first count signal from the low-absorption direct conversion material; or
when a correlation between the first count signal from the low-absorption direct conversion material and the second count signal from the high-absorption direct conversion material deviates from a reference correlation.

* * * * *